No. 754,803. Patented March 15, 1904.

UNITED STATES PATENT OFFICE.

SWIGEL POSTERNAK, OF MENDON, FRANCE.

ORGANIC PHOSPHORUS COMPOUND AND PROCESS OF MAKING SAME.

SPECIFICATION forming part of Letters Patent No. 754,803, dated March 15, 1904.

Application filed March 21, 1902. Serial No. 99,367. (Specimens.)

*To all whom it may concern:*

Be it known that I, SWIGEL POSTERNAK, a subject of the Emperor of Russia, residing at Place Rabelais 2, Mendon, France, have invented certain new and useful Improvements in Obtaining Foodstuffs, of which the following is a specification.

This invention relates to a process for obtaining the organic phosphorus compound contained in most vegetable foodstuffs, which is deposited as an independent phosphorus reserve material in cotyledons or tubercules, rhicomes, and the like of all cholorophyll plants. The said organic phosphorus compound possesses the chemical constitution $C_2H_5P_2O_7$, and as the latest experiments have shown it can be considered according to the grouping of its atoms as an anhydrooxymethylendiphosphoric acid. The process for obtaining this substance hereinafter described is based upon the observation that this organic phosphorus compound is readily soluble in weak mineral acids in the presence of earth alkalies usually found in plants and that the vegetable albumen in the presence of sufficient quantities of the above phosphorus compound is quite insoluble in diluted mineral acids and, moreover, upon the property of mineral acid extracts from plant seeds or oil-cakes, which consists in the fact that the organic phosphorus compound contained in these extracts is precipitated in the form of double salts of a metal base and of the alkaline earths, if to the extracts there is added a salt of a metal belonging principally to the copper group and if the free mineral acid is replaced by an organic acid by means of double decomposition with an organic alkali salt.

The process is carried out in the following manner with oil-cake, which is best suited for the purpose: One hundred kilograms of well pulverized oil-cake is stirred with three hundred liters of water, to which 0.3 per cent. of sodium hydroxid (soda-lye) is added. The whole is left to stand for about two hours, the object of this preparatory operation being to loosen or dissolve the aleurone bodies, in which the organic phosphorus compound is contained, in order to make this organic phosphorus compound readily capable of further treatment. After two hours from six to seven liters of commercial hydrochloric acid is added to the liquid and the whole is stirred energetically and left to stand at the ordinary temperature for about ten to twelve hours. At the end of this time the liquid is filtered, the residue pressed out, and the extraction renewed with from one hundred and fifty to two hundred liters of water acidulated with a liter of hydrochloric acid. The two extracts are mixed, and while stirring there are added to them several materials hereinafter mentioned in aqueous solution. To the extract there is first added in the following order an aqueous solution of three thousand grams of ordinary crystallized copper sulfate. To this is added five hundred grams of calcium chlorid, then three thousand grams of anhydrous sodium acetate, and finally one thousand grams of sodium hydroxid, (soda-lye.) The quantity of calcium chlorid can be greatly diminished if the cakes to be treated—for example, colza cake—are naturally rich in calcium salts, and in the latter event two hundred grams of calcium chlorid will suffice. After this treatment the liquid retains an acid reaction, and a rich precipitate of a blue-green color is formed. This precipitate consists of a mixture of the double salts of the organic compound of phosphorus, both with copper and with calcium, magnesium, iron, and manganese. The precipitate is allowed to settle. Then the liquid is decanted and filtered, the separated matter being subsequently washed with ordinary water. The residue is stirred with a suitable quantity of water and the mixture subjected to the action of hydrogen sulfid. In this way the copper salt is decomposed and the copper precipitated in the form of copper sulfid. The copper sulfid is filtered off and the liquid either evaporated to a syrupy consistency in a vacuum and precipitated with two volumes of alcohol of ninety-five proof or the syrup is directly evaporated to dryness and the dry material pulverized. In this way, according to the nature of the cakes employed, from two thousand five hundred to three thousand five hundred grams of a white powder is obtained, which is perfectly soluble in water, is free from inorganic phosphates, and contains more than twenty per cent. of its own weight of phosphorus.

It is obvious that instead of soda-lye potash lye may be employed without appreciably altering the result, and instead of calcium chlorid another soluble calcium salt, instead of hydrochloric acid any other mineral acid, and, likewise, instead of copper sulfate any other salt of copper, lead, or analogous metal, and instead of sodium acetate any other suitable alkali acetate may be used.

The product obtained by the process above described shows the above-mentioned proportion of phosphorus, and according to its nature and physiological action it is assimilable and may be employed as nourishment.

Over known processes the method above-described has many advantages, owing to the fact that the process involves only employment of a cheap and easily accessible material—viz., oil-cakes—also that this process, owing to the employment of the mineral acids used as extracting media, renders it practicable to obtain seventy-five to eighty per cent. of the phosphorus contained in the initial material in the form of the organic compound above defined, an output which by far exceeds any that has been previously obtainable.

Again, this process is directly applicable to the production of extracts free from albumen, and thereby enables me to avoid the tedious and time-wasting operations of coagulating and filtering the protein substances. Lastly, the product obtained according to this process is free from every organic impurity. This last-mentioned advantage is, indeed, obvious, since the proportion of phosphorus contained in the product which is prepared by this method is considerably higher than the proportion of phosphorus contained in other kindred substances that have been treated hitherto.

Having thus described my invention, I claim—

1. The herein-described process for obtaining the assimilable phosphorus compound contained in most vegetable foodstuffs and especially in oil-cake, consisting in suitably comminuting the vegetable material, treating the comminuted vegetable material with an alkali lye in order to loosen the aleurone bodies, treating further the mass with a dilute mineral acid, filtering and mixing the filtered liquid with a heavy metal salt, a salt of an alkaline earth, an alkaline salt of an organic acid, and an alkaline substance, in order to precipitate the phosphorus compound in presence of a free organic acid in the form of double salts of alkaline earths and heavy metals, treating a suspension of the said double salts in water with hydrogen sulfid and filtering for removing the heavy metal as sulfid, and finally evaporating the filtered liquid.

2. The herein-described process for obtaining the assimilable phosphorus compound contained in most vegetable foodstuffs and especially in oil-cake, consisting in treating the vegetable material with a dilute mineral acid, filtering and mixing the filtered liquid with a heavy metal salt, a salt of an alkaline earth, an alkaline salt of an organic acid and an alkaline substance, in order to precipitate the phosphorus compound in presence of a free organic acid in the form of double salts of alkaline earths and heavy metals, treating a suspension of the said double salts in water with hydrogen sulfid and filtering for removing the heavy metal as sulfid, and finally evaporating the filtered liquid.

3. The herein-described process for obtaining the assimilable phosphorus compound contained in most vegetable foodstuffs and especially in oil-cake, consisting in mixing an extract of the vegetable material in a mineral acid with a heavy metal salt, a salt of an alkaline earth and an alkaline salt of an organic acid and an alkaline substance, in order to precipitate the phosphorus compound, in presence of a free organic acid, in the form of double salts of alkaline earths and heavy metals, treating a suspension of the said double salts in water with hydrogen sulfid and filtering for removing the heavy metal as sulfid, and finally evaporating the filtered liquid.

4. The herein-described process for obtaining the assimilable phosphorus compound contained in most vegetable foodstuffs and especially in oil-cake, consisting in treating a suspension of double salts of the said phosphorus compound with alkaline earths and heavy metals with hydrogen sulfid, filtering for removing the precipitated metal sulfid, and finally evaporating the filtered liquid.

5. The herein-described process for obtaining the assimilable phosphorus compound contained in most vegetable foodstuffs, and especially in oil-cake, consisting in treating a suspension of double salts of the said phosphorus compound with alkaline earths and heavy metals with hydrogen sulfid, filtering for removing the precipitated metal sulfid, evaporating the filtered liquid to a syrupy consistency, precipitating the alcohol, drying, and finally pulverizing.

6. As a new article of manufacture, the herein-described mixture of acid salts of the organic assimilable phosphorus compound of vegetable foodstuffs, corresponding to the formula $C_7H_5P_2O_9$, which constitutes, in dry state, a white powder, soluble in water, free from inorganic phosphates and containing more than twenty per cent. of its own weight of phosphorus.

In testimony whereof I have hereunto set my hand in the presence of two witnesses.

SWIGEL POSTERNAK.

Witnesses:
EDWARD P. MACLEAN,
J. ALLISON BOWEN.